J. N. LANE.
Seed-Planter.
No. 53,635 — Patented Apr 3. 1866.
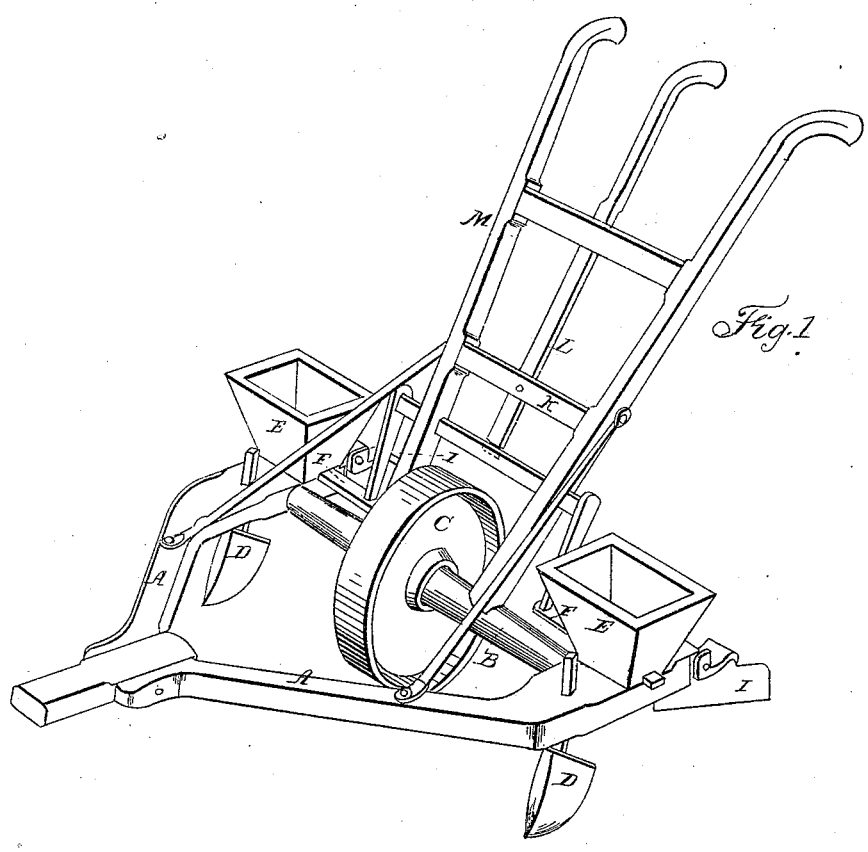
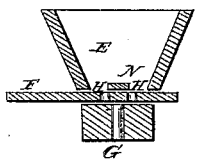

UNITED STATES PATENT OFFICE.

JAMES N. LANE, OF BETHEL, KENTUCKY.

IMPROVEMENT IN SEED-PLANTERS.

Specification forming part of Letters Patent No. 53,635, dated April 3, 1866.

*To all whom it may concern:*

Be it known that I, JAMES N. LANE, of Bethel, in the county of Bath and State of Kentucky, have invented a new and useful Improvement in Seed-Planters; and I do hereby declare that the following is a full, clear, and exact description thereof, reference being had to the annexed drawings, made part of this specification, in which—

Figure 1 is a perspective view, and Fig. 2 a vertical section, of one of the seed-boxes.

My improvement relates to the construction of a one-horse seed-planter actuated by hand.

A A is the main frame, terminating in a point at the front, to which a single horse is attached in any convenient manner. To this frame are attached the shovels D D, and to the rear end, hinged upon the pivots, are attached the covering-scrapers I I, which are disposed diagonally to the line of draft, and are hinged so as to pass over immovable projections or irregularities, which would otherwise break them.

Across the frame toward its rear end passes the axle B, the journals of which are attached to suitable boxes on the frame, and which supports the ground-wheel C, running between the rows to be planted.

On the frame and near the rear end are fastened the seed-boxes E E, over the bottom of which, through suitable slots in the sides, pass the seed-slides F F. Across the bottoms of the seed-boxes E E, disposed from front to rear, midway of the length of the boxes, are narrow boards N, fitting snugly above the slides F, and immediately under the middle of these boards are openings through the frame, permitting the seed to fall from the boxes onto the ground, where they are covered by the scrapers.

There are two holes through the slide F, so disposed that they will, as the slide is moved from side to side, be alternately brought into the grain at the side of the cross-board N and carried under this board to discharge the seeds they contain through the hole G. These slides F F are moved by the tie K, to which is attached, at its center, the lever L, which is fastened to the handles M and actuated by hand. This handle L works through slots in ties uniting the handles M M, and is pivoted in the lower one.

When it is desired to plant without covering the hinged scrapers I may be turned up.

What I claim as my invention, and seek to secure by Letters Patent, is—

1. The scrapers I, when hinged to the frame and disposed diagonally to the line of draft, substantially as set forth.

2. The arrangement of a seed-planter for one horse with seed-valves operated by hand, when the parts are constructed and combined substantially as set forth.

In testimony whereof I have signed my name to this specification in the presence of two subscribing witnesses.

J. N. LANE.

Witnesses:
JOHN S. HOLLINGSHEAD,
JOHN D. BLOOR.